United States Patent [19]

Klinger

[11] Patent Number: 4,721,896
[45] Date of Patent: Jan. 26, 1988

[54] DRIVE CONTROLLED BY A SEQUENCE OF PULSES

[76] Inventor: Hermann Klinger, Im Gehren 12, D-7300 Esslingen, Fed. Rep. of Germany

[21] Appl. No.: 899,489

[22] Filed: Aug. 22, 1986

[30] Foreign Application Priority Data

Aug. 24, 1985 [DE] Fed. Rep. of Germany ....... 3530271

[51] Int. Cl.⁴ .............................................. G05B 19/40
[52] U.S. Cl. ..................................... 318/685; 318/696
[58] Field of Search ............... 318/599, 603, 341, 685, 318/696

[56] References Cited

U.S. PATENT DOCUMENTS

| | | | |
|---|---|---|---|
| 4,214,193 | 7/1980 | Mason | 318/611 |
| 4,258,301 | 3/1981 | Kawa | 318/594 |
| 4,368,412 | 1/1983 | Inoue | 318/632 |
| 4,383,245 | 5/1983 | Cooley et al. | 340/347 DA |
| 4,510,266 | 4/1985 | Eertink | 318/696 |

Primary Examiner—William M. Shoop, Jr.
Assistant Examiner—Saul M. Bergmann
Attorney, Agent, or Firm—McGlew and Tuttle

[57] ABSTRACT

The invention relates to drive controlled by a sequence of pulses and which in place of a stepper motor with its associated circuit makes use of a continuous displacement motor, such as a DC motor, which may be directly connected with a process computer. The motor is coupled with an incrementally operating displacement sensor which for each displacement increment to be caused by a control pulse, generates precisely one sensed pulse. The sensed pulses and the control pulses are fed to an up-down counter via an electronic separating filter. The output signal of the counter and that of a periodically upwardly counting ancilllary counter is used for addressing a ROM whose output bit pattern controls the power switching stages of the DC motor or other continuous drive.

5 Claims, 3 Drawing Figures

DRIVE CONTROLLED BY A SEQUENCE OF PULSES

BACKGROUND OF THE INVENTION

The invention relates to drives operated by a sequence of pulses, and more particularly to such a drive comprising a control circuit and a motor operated thereby, in which the desired motion of the motor is represented by a chain of pulses of which each pulse is representative of an incremental displacement of the motor.

Known drives of this sort make use of a stepper motor and the control circuit serves to convert a control pulse train into a power pulse train supplied to the stepper motor. In response to each incoming power pulse the stepper motor turns through a given angle so that the true position of the motor is to be dictated by the sum of all the control pulses received.

If varying loads have to be driven by the stepper motors of such known drives it may happen that when the load torque is particularly high the stepper motor fails to completely respond to a power pulse and is not advanced by one step into the next angular position but drops back into the previous one. Such a case may for example occur if the part moved by the stepper motor runs skew in its guide or otherwise jams. If a control pulse is "lost" in this manner, the true position of the stepper motor will from then on no longer tally with the position assumed by the computer or the like on the basis of the number of pulses sent to the motor.

In order to move heavy loads with time-dependent fluctuations, other types of motors such as DC motors or compressed air motors are well suited, which are able to supply very high torques or linear forces. However, such motors functioning in an analog or continuous manner have not so far been able to be operated by simple chains of pulses like stepper motors.

SHORT OVERVIEW OF THE PRESENT INVENTION

Accordingly one object of the present invention is to devise a drive operated by a sequence of pulses which represents an improvement on known drives.

A further object of the invention is to create such a drive which is able to exert great forces - more specifically torques - on a load.

In order to attain these or other objects appearing from the present specification and claims, in the invention a drive adapted to be operated by a sequence of pulses, comprising a control circuit and a motor operated thereby, in which the desired motion of the water is represented by a chain of control pulses of which each pulse is representative of an incremental displacement of the motor, is characterized in that the motor is a continuous displacement motor, the drive further comprising: a displacement sensor coupled with the motor and adapted to produce a sensed pulse for a movement of the motor corresponding to the incremental displacement, a subtraction circuit comprised in the control circuit and being connected to receive control pulses and sensed pulses, the subtraction circuit having a first input connected to receive pulses derived from the control pulses and a second input connected to receive pulses derived from the sensed pulses, a signal processing circuit comprised in the control circuit, the processing circuit being adapted to ensure that even if the control circuit simultaneously receives control pulses and sensed pulses each such pulse may lead to a change in the output signal of the subtraction circuit, and power stage means wired to be driven by an output signal of the subtraction circuit, the power stage means being connected for driving the motor.

In the controlled drive of the present invention a continuous displacement motor, as for instance a DC motor or a compressed air motor, is used which is connected with a displacement sensor. Feedback loops which have displacement sensors associated with a servo for ascertaining its true position have, admittedly, been previously proposed. However, in keeping with the invention the motor displacement sensor is so designed that for each desired displacement increment which is to be produced by a control pulse it produces exactly one sensed pulse. This facilitates the combination of the control pulses and the sensed pulses by a simply designed subtracting circuit whose output signal represents an error signal and is used for driving the power stages which supply the motor with energy.

In keeping with the invention there is furthermore a signal processing circuit which serves to prevent coincidence of control pulses and sensed pulses leading to a falsification of the error signal supplied by the subtracting circuit.

In the context of an NC machine tool or other machine with digitally operated servo motors, the present invention makes it possible to replace a stepper motor by a drive yielding a higher torque without any other changes in the NC unit. To effect this it is only necessary in practise to use a few low price standard semiconductor components.

Advantageous further developments of the invention are specified in the claims.

In order to produce a motor follow up rate that is proportional to the error signal produced by the subtraction circuit, it is possible for the output signal of the subtracting circuit to be supplied to a D/A converter and to use its output signal for analog drive of the motor, as for instance through a power amplifier.

In keeping with a further feature of the invention the output signal of the subtracting circuit is used for addressing a ROM in which drive characteristics are stored. This leads to an even greater breadth of variation in the selection of the follow up rate as dependent on the error signal.

As a further feature of the invention the output signal of the subtracting circuit represents a first part of an address for the ROM and the second address part is formed by the output signal of an ancillary counter, whose count terminal is connected with the output of a first ancillary clock, whereas the subtracting circuit is driven by a second ancillary clock whose period is so selected that in it the ancillary counter is able to go through a complete count at least once. Furthermore one respective digital signal bit is used at the output of the ROM for driving the power switching stages. In such a drive only digital "0" or "1" signals will appear at the output of the ROM and the time-averaged value of these signals is aligned with the desired follow up rate. This makes possible the use of low price and readily available power switching stages such as thyristors. In the case of motors such as air power motors, for which there are no analog controlled power switching stages readily available or available at a reasonable price, the use of digital power switching stages makes possible fine adjustment of the follow up rate in this form of the invention.

In order to ensure that none of the control pulses or the follow up pulses if left out of consideration, then in a further form of the invention such pulses may be greatly shortened in duration and necessarily so interlaced in time that there is certainly no overlap. The drive then comprises an ancillary counter, a first ancillary clock, and a second ancillary clock. Furthermore the output signal is generated in such a manner that a first part thereof represents one address for the ROM and a second part thereof is formed by an output signal of the ancillary counter, a count terminal of the ancillary clock, whereas the subtraction circuit is connected to be driven by the second ancillary clock, whose period is such that the ancillary counter is able to be fully incremented at least once within the duration thereof, and wherein one respective digital signal bit is used at the output of the ROM for driving the power stage means. In place of this it is also possible to provide a respective counter for the control pulses and the follow up pulses and thus to subtract the two counts periodically by the subtraction circuit. The drive may furthermore comprise an ancillary counter, a first ancillary clock, and a second ancillary clock, and the output signal is generated in such a manner that a first part thereof represents one address for the ROM and a second part thereof is formed by an output signal of the ancillary counter, a count terminal of the ancillary counter being connected with an output terminal of the first ancillary clock, whereas the subtraction circuit is connected to be driven by the second ancillary clock, whose period is such that the ancillary counter is able to be fully incremented at least once within the duration thereof, and wherein one respective digital signal bit is used at the output of the ROM for driving the power stage means.

The invention will now be described in detail in what follows with reference to working examples as shown in the drawings.

LIST OF THE SEVERAL VIEWS OF THE DRAWINGS

DETAILED ACCOUNT OF WORKING EXAMPLE OF THE INVENTION

Figure 1:
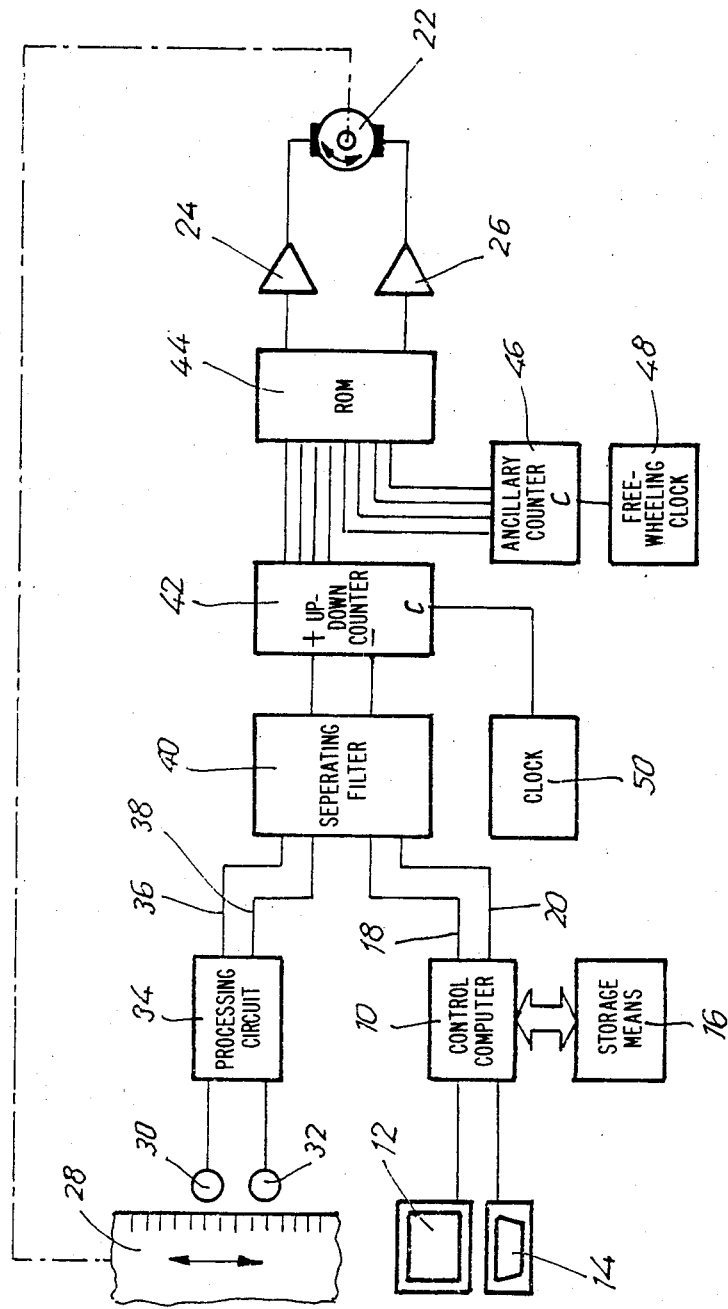
FIG. 1 is a block schematic of a DC motor drive controlled by a sequence of control pulses.

In FIG. 1, 10 denotes a process control computer having a CRT 12, a keyboard 14 and a mass storage means 16. The process control computer 10 may for example be part of an NC machine tool and in response to data entered via the keyboard 14 and using control programs in the mass storage means 16 it drives a number of servo motors, as for instance for the displacement of a machine tool carriage in the x, y and z directions. For the purposes of the ensuing account of the invention, only the operation of a single servo motor by the process control computer 10 will be reviewed; further servo motor control channels may be analogous in design.

It is generally conventional for such process control computers 10 to cooperate with stepper motors which are operated by control pulses supplied sequentially via a line 18, while a direction control signal is conducted by a further line 20. If a stepper motor is connected to the process control computer 10 its shaft will be turned through an angular increment for each control pulse supplied from the process control computer 10, the direction of turning being determined by the control direction signal conducted by line 20.

In the case of the drive described in the present instance, there is a DC motor 22 in place of a conventionally employed stepper motor. It is supplied with power via amplifiers 24 and 26. For the purpose of the present account it is assumed that the DC motor 22 turns clockwise when it is supplied by the amplifier 24 and it is turned counter-clockwise if it is driven by the amplifier 26 and that is stationary if the amplifiers are both simultaneously in or out of operation.

In the case of a DC motor the angular displacement of the motor output shaft depends on the size of the load to be driven and on the duration of the excitation of the DC motor. The true position of the motor shaft is accordingly not unequivocally dependent on the history of the excitation of the motor disregarding the load. In what follows an account will be given of various possible circuits which ensure that the true position of the DC motor 22 is unequivocally controlled by the control signals coming from the process control computer 10 via the lines 18 and 20.

The shaft of the DC motor 22 is coupled with a disk 28 with graduations of which only a section of the edge is to be seen in a developed view in FIG. 1. The disk 28 cooperates with two sensors 30 and 32 placed at positions which are not equivalent as regards the graduations and which may take the form of photoelectric detectors working by reflected or transmitted light. The output signals of the sensors 30 and 32 pass to a processing circuit 34, which derives a sensed pulse train from the sensor output signals, and in this train one pulse corresponds to the motion of a graduation past the sensor arrangement. The circuit 34 furthermore derives a sensor direction signal indicative of the direction of motion of the disk 28 and accordingly of the DC motor 22.

The sensed pulses produced by the processing circuit 34 are conducted by a line 36 to an electronic separating filter 40 and the sensor direction signal is conducted to it via a line 38 thereto. The construction of the filter 40 will be described in detail later with reference to FIG. 3. Generally speaking the manner of operation of the filter is as follows. The control pulses and the sensed pulses are converted into short pulses (without the loss of any pulses in the process) and such short pulses are then interlaced so that there is no time overlap of control and sensed pulses. Furthermore the control pulses and the sensed pulses are caused to "cross over", i.e. with the same given directional signal the control pulses arrive at the one output terminal of the processing circuit, and the sensed pulses arrive at the other output terminal. Upon a change in the directional signal there will also be a switching over to the other output terminal.

The two output terminals of the electronic separating filter 40 are connected with the up count terminal and, respectively, with the down count terminal of an up-down counter 42. In the case of the manner of functioning of the electronic filter 40 as qualitatively described above, the up count terminal of the up-down counter 42 thus receive the control pulse in the forward direction and the sensed pulses in the rearward direction, whereas the down counter terminal gets the control pulses in the rearward direction and the sensed pulses in the up direction. The output signal of the up-rearward counter 42 thus corresponds to the difference between the desired and true positions of the DC motor 22.

The output signal of the up-down counter 42 forms four of the eight address bits of a ROM 44. The remaining four address bits are taken from the output of an ancillary counter 46, whose count terminal is joined with the output of a free-wheeling clock 48. The clock 48 is operated at a high frequency, in practise 30 kHz, and at a correspondingly high rate the address bits at the output of the ancillary counter 46 will be cyclically swept or addressed; in the associated cells of the ROM 44, bit patterns are stored which serve for driving the amplifiers 24 and 26. Using the four address bits delivered by the ancillary counter 46 it is possible to address 16 memory cells. If the bit patterns stored in them each have the bit "1" at the position corresponding to the amplifier 24 and at the position associated with the amplifier 26 the bit "0", the DC motor 22 will be excited by the amplifier 24 for all the 16 address cycles, that is to say it will run clockwise at maximum torque.

If only half of the memory cells addressed by the ancillary counter 46 of the ROM 44 has a "1" bit at the position corresponding to the amplifier 24, whereas at the other positions there is a "0" bit and if at the same time all the bits accociated with the amplifier 26 have the value "0", it will be clear that the DC motor 22 will on average run with half the maximum torque in the clockwise direction.

The reader will be able to see that owing to the use of such bit patterns the average output torque of the DC motor 22, and accordingly its follow up speed may be adjusted in fine steps.

Using the address part delivered at the output of the up-down counter it is possible to switch over between different sections of the ROM 44, which bear different bit patterns and are read cyclically under the control of the ancillary counter 46. It is in this manner that a very wide range of variation of control of the DC motor 22 is made possible in accordance with the difference between the desired and true positions.

In order to ensure that the address part delivered by the up-down counter only changes at a slow rate so that the respectively selected memory section is in fact completely addressed throughout by the ancillary counter 46, the outputting of the count of the up-down counter 42 takes place under the control of a further clock 50, whose operating frequency is lower than that of the clock 48 and in practise will be about 10 kHz.

Figure 3:
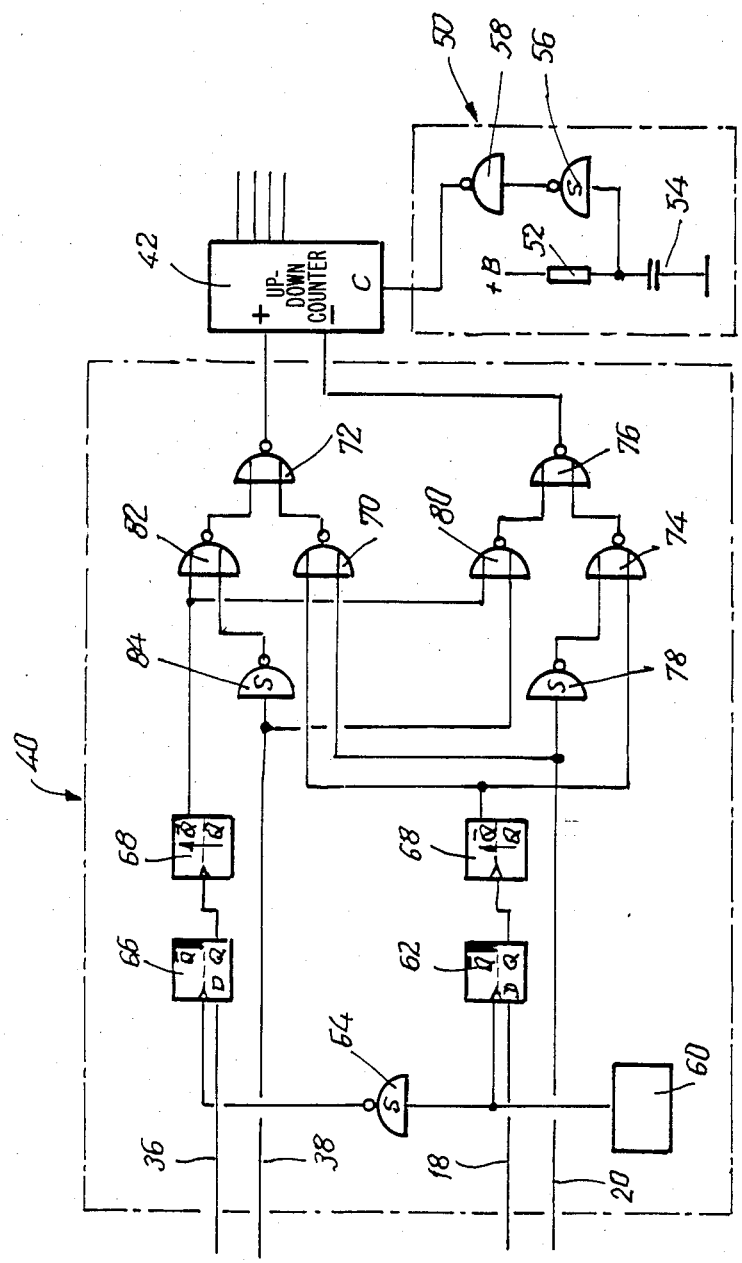
FIG. 3 shows details of an electronic separating filter as used in the drive of FIG. 1 and of an ancillary clock which may be used with the drive of FIG. 1 or with that of FIG. 2.

As will appear from FIG. 3, the clock 50 has an RC oscillating circuit formed by a resistor 52 and a capacitor 54 connected in series therewith. A Schmitt trigger 56 is connected to the junctions between the resistor 52 and the capacitor and its output signal is amplified by an inverter 58.

As also shown in FIG. 3 the electronic separating filter has an ancillary oscillator 60, which runs at a higher frequency than the clock 48, that is to say, in practise, 100 kHz.

The output of the ancillary oscillator 60 is connected with the clock terminal of a D flip-flop 62, and via a NAND Schmitt trigger 64 clocks a second D flip-flop 66. The D input of the D flip flop 62 is connected with the line 18 so that it receives the control pulses. In an analogous manner the D input of the D flip-flop 66 is connected with the line 36 and so receives the sensed pulses.

The Q outputs of the D flip-flop 62 and 66 are connected with the multivibrators 68 triggering with a time lag.

Accordingly short pulses which are offset by half the period of the ancillary oscillator 60 appear at the $\bar{Q}$ outputs of the monostable multivibrators if there were simultaneous pulses on the lines 18 and 36. In practise the period of the monostable multivibrators is made equal to one microsecond.

The shaped output signal of the D flip-flop 62 may pass via a NOR gate 70 and a further NOR gate 72 to the up terminal of the up-down counter 42, if there is a signal on the line 20 corresponding to the "forward" control direction, such signal being supplied to a second input of the NOR gate 70.

The shaped output signal of the D flip-flop 62 may in the other case pass via a NOR gate 74, and a further NOR gate 76 to the down terminal of the up-down counter 42 if there is no direction signal on the line 20 corresponding to the forward control direction, such signal being supplied to a second input of the NOR gate 70. For this purpose there is a second input of the NOR gate 74 which is connected via a NAND Schmitt trigger 78 with the line 20.

The switching over of the unshaped and phase-shifted output signals of the D flip flop 66 to the up and, respectively, down terminal of the up-down counter 42 takes place in an analgous manner, but is "crossed over" as compared with the shaped output signals of the D flip-flop 62.

The shaped output signals of the D flip-flop 66 pass via a NOR gate 80 and a subsequent NOR gate 76 to the down terminal of the up-down counter 42, if there is a directional signal on the line 38 corresponding to forwards. For this purpose there is a second input of the NOR gate 80 which is joined to the line 38. Absent such directional signal, this indicating that the DC motor 22 is running in reverse, the shaped output signal of the D flip-flop 66 will go via a NOR gate 82 and the following NOR gate 72 to the up terminal of the up-down counter 42, for which reason a second input of the NOR gate 82 is connected via a NAND Schmitt trigger 84 with the line 38.

Figure 2:
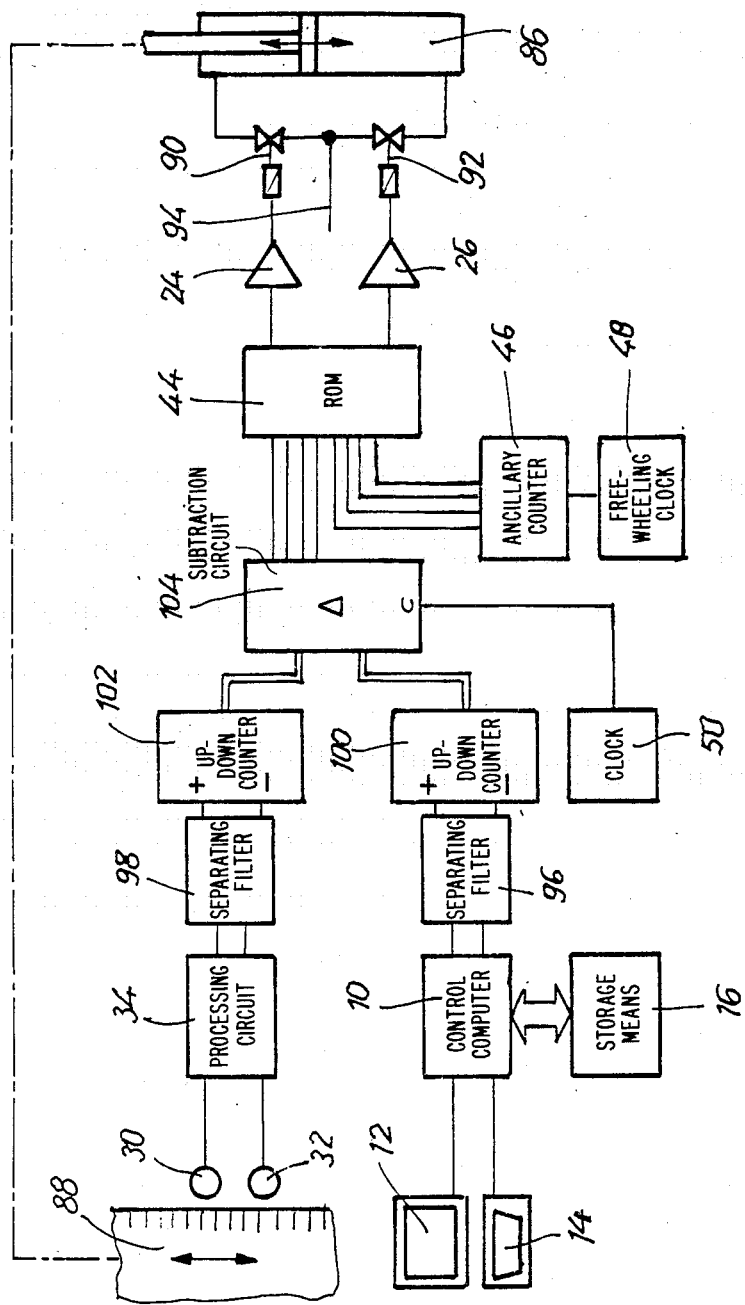
FIG. 2 is a block schematic of a drive controlled by a sequence of control pulses and designed around a double acting cylinder and piston actuator.

The controlled drive shown in FIG. 2 is generally similar to the FIG. 1 and functionally equivalent components, which are identically referenced, are not described.

In lieu of the DC motor 22 there is a double acting cylinder actuator 86, whose piston rod is coupled with an elongated plate 88 with graduations for cooperation, as in FIG. 1, with the sensors 30 and 32.

The two piston spaces of the cylinder actuator 86 may be joined with a pressure line via solenoid valves 90 and 92. The pressure line 94 is connected with a compressed air pump (not shown) or with a source of liquid under pressure. The control of the solenoid valves 90 and 92 is by means of the amplifiers 24 and 26.

In place of the electronic separating filter 40 acting in two planes of the drive, as in FIG. 1, in the drive of FIG. 2 there is simple electronic separating filter 96 and 98 both for the true position signal channel and also for the desired position channel. Such filters cause the pulses on the line 18 and, respectively, 36 to pass via the line 20 and, respectively, 38 to the up count terminal or the down count terminal of a following up-down counter 100 and, respectively, 102 in accordance with the directional signal.

Consequently the signal appearing at the output of the up-down counter 100 is a true position signal produced by summation of the control pulses, whereas the output signal of the up-down counter 102 amounts to a true position signal produced by summation of the sensed pulses. The counts of the up-down counters 100 and 102, which in practise are for instance 16 bits long and are supplied to the two inputs of a digital subtraction circuit 104 which is clocked by the clock 50.

It will be noted that in the case of the drive system of FIG. 2 as well, no sensor or control pulses are left out of consideration in the production of the deviation signal appearing at the output of the subtraction circuit 104. The output signal of the subtraction circuit 104, which may only change at a very slow rate, again forms, together with the output of the ancillary counter 46, an address signal for the ROM 44, and the driving of the amplifiers 24 and 26 takes place in such a way that the solenoid valves 90 and 92 are opened and shut with a duty cycle dependent on the deviation signal in a manner similar to that described in connection with FIG. 1.

A simplified electronic separating filter may be constructed on the basis of the complex electronic filter of FIG. 3, if one omits the components serving for time interlacing and shaping of the pulses and also those circuits which are provided for the cross over of sensed pulses and control pulses.

In the case of a working embodiment of the circuit shown in FIG. 3 it is possible for the D flip-flops 62 and 66 to be formed by the stages of an IC of the type 7474. Similarly, for the two monostable multivibrators 68 it is possible to use an IC of the type 74123. The various NAND Schmitt triggers may be in the form of IC's of the type 7414 and the various NOR gates may be IC's of the type 7402. The up-down counter 42 is an IC of the type 74193.

I claim:

1. Drive control system for a continuous displacement motor operated by a sequence of control pulses of which each pulse is representative of an incremental displacement of the motor comprising: a displacement sensor coupled with the motr and adapted to produce a sensed pulse for a movement of the motor corresponding to an incremental displacement of the motor; means for generating control pulses; subtraction circuit means, having a first input adapted to receive pulses corresponding to said control pulses, and a second input adapted to receive pulses corresponding to said sensed pulses, for generating a digital signal representing the difference between said control pulses and said sensed pulses, said digital signal corresponding to the difference between the desired and true positions of the motor; signal processing means for insuring that each control pulse and each sensed pulse may lead to a change in a distinct output signal of said subtraction circuit means when said control pulses and said sensed pulses are received simultaneously; a ROM having drive characteristics stored therein, and connected to be partially addressed by an output signal of said subtracting circuit, said ROM producing a driving digital signal bit; and, power stage means connected to said ROM for powering the motor based on said driving digital signal bit.

2. A drive control system according to claim 1, further comprising: an ancillary counter-connected to said ROM; a first ancillary clock connected to said ancillary counter; and, a second ancillary clock connected to said subtraction circuit means the output of the subtraction circuit means together with the output of the ancillary counter forming a complete address word to the ROM including high-order bits and low-order bits, said high-order bits addressing the ROM through the output of said subtraction circuit means and the low-order bits addressing the ROM by said ancillary counter, said ancillary counter having a count terminal connected with an output terminal of said first ancillary clock, and said subtraction circuit means being connected to be driven by said second ancillary clock, said second ancillary clock having a period which is such that the ancillary counter is able to be fully incremented at least once within the period of said second ancillary clock.

3. The drive control system as claimed in claim 1, wherein: said displacement sensor is adapted to produce a sensor directional signal being utilized for predicating the desired direction of motion of said motor; said signal processing means including first and second separating filters for the respective control pulses and also for the sensed pulses; and, first and second up-down counters connected to said corresponding first and a second filters, each said filter supplying pulses to a first and a second terminal of each of said up-down counters in response to the respective directional signal, each of said updown counters having data output terminals connected with two input terminals of said subtraction circuit, said subtraction circuit being a digital circuit.

4. The drive control system in claim 1 wherein said displacement sensor is additionally adapted to generate a sensing directional signal, and for predicating the desired direction of operation of the motor a control directional signal is generated, said drive control system further comprising: a pulse shaped circuit means within said signal processing circuit means said shaping circuit means being adapted to produce short-phase shifted pulses free from overlap between the control and sensed pulses, an up-down counter forming said subtraction circuit, and an electronic separating filter switched in phase with the production of the reshaped control pulses, said filter being adapted to feed, when the control directional signal and the sensing directional signal are the same, the reshaped sensed pulses to the one or to the other count terminal of said up-down counter and producing a connection with the other count input terminal of said up-down counter, depending on the direction of said directional signal.

5. The drive control system, as claimed in claim 4 comprising
   a high frequency ancillary oscillator as part of said shaping circuit means,
   a flip-flop clocked by one type of pulse signal and responding to an output signal of said ancillary oscillator,
   a flip-flop responding to a further type of pulse signal and being clocked by an inverted output signal of said ancillary oscillator,
   respective monostable multivibrators connected with outputs of the said clocked flip-flops, said multivibrators having a period that is less than half the period of the ancillary oscillator.

* * * * *